United States Patent [19]
Broese et al.

[11] Patent Number: 5,608,842
[45] Date of Patent: Mar. 4, 1997

[54] METHOD AND DEVICE FOR CONDUCTING A PROCESS IN A CONTROLLED SYSTEM WITH AT LEAST ONE PRECOMPUTED PARAMETER BASED ON A PLURALITY OF RESULTS FROM PARTIAL MATHEMATICAL MODELS COMBINED BY A NEURAL NETWORK

[75] Inventors: Einar Broese; Otto Gramckow, both of Erlangen; Thomas Martinetz, Munich; Guenter Soergel, Nuremberg, all of Germany

[73] Assignee: Siemens Aktiengesellschaft, München, Germany

[21] Appl. No.: 336,958

[22] Filed: Nov. 10, 1994

[30] Foreign Application Priority Data

Nov. 11, 1993 [DE] Germany .......................... 43 38 615.6

[51] Int. Cl.⁶ ................... G06E 1/00; G06E 3/00
[52] U.S. Cl. ............... 395/21; 364/148; 364/157
[58] Field of Search .................. 395/21, 22, 23, 395/24; 364/148, 157

[56] References Cited

U.S. PATENT DOCUMENTS

| | | | |
|---|---|---|---|
| 4,990,838 | 2/1991 | Kawato et al. | 318/568.1 |
| 5,175,678 | 12/1992 | Frerichs et al. | 364/148 |
| 5,253,328 | 10/1993 | Hartman | 395/24 |
| 5,268,834 | 12/1993 | Sanner et al. | 364/151 |
| 5,283,746 | 2/1994 | Cummings et al. | 364/468 |
| 5,311,421 | 5/1994 | Nomura et al. | 364/157 |

FOREIGN PATENT DOCUMENTS

| | | |
|---|---|---|
| 4040360A1 | 6/1991 | Germany . |
| 4111354A1 | 10/1992 | Germany . |
| 4130164A1 | 3/1993 | Germany . |
| 1794516A1 | 2/1993 | Russian Federation . |
| 442459 | 12/1974 | U.S.S.R. . |
| 807211 | 2/1981 | U.S.S.R. . |

OTHER PUBLICATIONS

Silvestrini, et al., "Autoadaptive process control of a Sendzimir mill at ILVA," *Iron and Steel Engineer,* pp. 50–55 (Aug. 1993).

Sun, et al., "A Hybrid Neural Network Model for Solving Optimization Problems," *IEEE Transactions on Computers,* vol. 42, No. 2, pp. 218–227 (Feb. 1993).

*Primary Examiner*—Robert W. Downs
*Assistant Examiner*—A. Katbab
*Attorney, Agent, or Firm*—Kenyon & Kenyon

[57] ABSTRACT

In known methods for conducting a process in an automatically controlled system, the system is preset at the beginning of each process run according to at least one process parameter. The at least one process parameter is precomputed with a model of the process which is supplied with input values. During the process, the input values and the process parameters are measured and are used after the process run to adaptively improve the precomputed value of the process parameters. To simplify and improve the precomputed value of a model having a plurality of partial models, computed results of the partial models are supplied to a neural network. The neural network produces the process parameters to be precomputed as a network response. The network parameters of the neural network are modified after each process run to adapt the precomputed value to the actual process events.

19 Claims, 2 Drawing Sheets

METHOD AND DEVICE FOR CONDUCTING A PROCESS IN A CONTROLLED SYSTEM WITH AT LEAST ONE PRECOMPUTED PARAMETER BASED ON A PLURALITY OF RESULTS FROM PARTIAL MATHEMATICAL MODELS COMBINED BY A NEURAL NETWORK

BACKGROUND OF THE INVENTION

The present invention concerns a method for conducting a process in an automatically controlled system. A mathematical model of the process, with at least one variable model parameter, is implemented in a computing means. Before the process is started, the model precomputes at least one selected process parameter according to input values supplied to it for presetting the system. The input values and the process parameter are measured during the process and the precomputed value of the process parameter is adaptively improved after the process based on the measured input values. Furthermore, the present invention concerns a device for implementing a method for conducting a process.

A method and a device for conducting a quasi-continuous process in an automatically controlled system are discussed in German Patent Application No. 40 40 360. Such processes typically include rolling trains where each pass of a rolled strip forms a process cycle (hereinafter, "process run"). Like all actual industrial processes, these process runs are time-variable. To conduct such processes, the system controlling the process must be preset before each run. That is, unlike traditional closed-loop control, control must precede the actual process because in industrial processes, controlled values can often be measured only indirectly and not at the point of affection of the process. Consequently, direct closed-loop control is not possible.

The system controlling the process is preset in a known manner by precomputing selected process parameters according to pre-established input values, or initially estimated input values, or both, based on a pool of relevant mathematical models of the process and by presetting the system using the precomputed parameters. Since mathematical models of the process to be conducted can only approximate the actual process, the model must be adaptively matched to the actual process events. For this, the process parameters and the input values are measured directly or indirectly by determining other measured values during each process run. After the process run is complete, the precomputation performed with the mathematical models is repeated within the framework of a postcomputation done based on the input values subsequently measured. The variable model parameters are adaptively modified based on the deviation between the process parameters thus computed and the measured process parameters to reduce the deviations obtained. The model parameters thus adapted are available at the beginning of the following process run for precomputing the process parameters.

With very complex relationships, partial aspects of the process to be modeled are usually described in partial models, and the interaction among the partial aspects of the process is described by a higher order model that links the partial models. While the partial models are still capable of describing the respective partial aspects of the process with sufficient accuracy, model assumptions for linking the partial models are difficult to make and such models may be subject to serious errors. In particular, adapting the higher-order model in addition to adapting the partial models is very difficult because the partial models provide no exact measured values, but only estimated values as input values for the higher-order model.

The goal of the present invention is to improve the precomputed value of the process parameter in the case of a very complex relationship between the process parameter and the input values.

SUMMARY OF THE INVENTION

The present invention achieves this goal, in the case of a model consisting of a plurality of partial models, based on the method of the aforementioned type, by supplying the computed results of the partial models to a neural network. The neural network produces the process parameter to be precomputed as a network response, and by using the deviation between the network response and the measured process parameters for adapting the network parameters of the neural network. Accordingly, for the corresponding device, the model includes a plurality of partial models with a neural network connected after the partial models to link the computed results of the partial models into a precomputated value of the process parameter.

Partial aspects of the process to be conducted are described, in the past by models—in the present invention by partial models, with a teachable neural network linking together the computed results delivered by the partial models. Using a neural network to link the partial models is advantageous compared with using a higher-order model to link the partial models with one another because designing and training the neural network is less expensive than qualifying such a higher-order model. Using a neural network to link partial models is advantageous compared with the other possible option of replacing the mathematical model entirely with a neural network because the prior results and experience continue to be valid for the mathematical modeling of processes. Accordingly, using the neural network with the mathematical partial models is also simpler than a corresponding overall neural network, resulting in better solutions for conducting the process.

In an advantageous refinement of the method according to the present invention, in addition to the computed results of the partial models, input values, whose influence on the process parameters to be precomputed cannot be described in the models, are directly supplied to the neural network.

The network parameters are advantageously adapted on-line by using the measured input values and the measured process parameters after each process run to adapt the network parameters. Hence, the predicted value for the process parameter delivered by the neural network is constantly adapted to the actual, i.e., time-varying process. Adapting the network parameters of the neural network on-line uses less computing resources than adapting the model parameters of the mathematical model on-line.

The method according to the present invention is used, in particular, in processes of process industries in which parts of the process can be described by suitable models. In this context, rolling processes can be conducted using the method of the present invention. In rolling processes conducted using the method of the present invention, the partial models are preferably assigned to individual rolling stands of a rolling train. The neural network links the computed results, delivered by the partial models for each individual rolling stand, into a predictive value of the process parameter for the entire rolling train.

According to a preferred application of the method of the present invention, the partial models compute the roll gap profiles of the individual rolling stands and the neural network links the computed roll gap profiles to form a predictive value for the strip thickness profile.

BRIEF DESCRIPTION OF THE DRAWINGS

The present invention is explained in detail below using the figures of the drawing.

DETAILED DESCRIPTION

Figure 1:
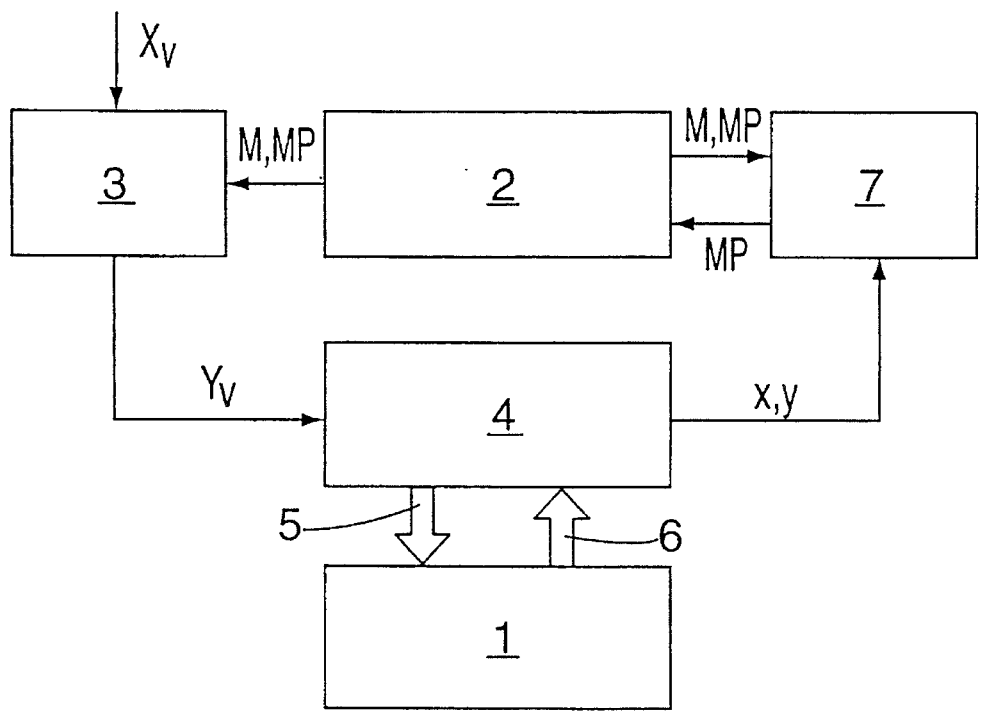
FIG. 1 is a block schematic which shows a known arrangement for conducting an industrial process, which implements mathematical models of the process for presetting a system controlling the process.

FIG. 1 is a block schematic which shows a conventional arrangement for conducting an industrial process, for example, a rolling process. The industrial process is denoted by a function block 1. A mathematical model M of the process, including the associated variable model parameters MP, is implemented in a computing means 2. The model M may include a plurality of partial models. Before the beginning of each process run, a precomputing means 3 extracts the necessary model equations of mathematical model M, with the current model parameters MP, from computing means 2. Selected process parameters $Y_v=(Y_{1v}, \ldots, Y_{mv})$ are then precomputed in precomputing means 3 based on the equations of model M and based on given or estimated input values $X_v=(X_{1v}, \ldots, X_{nv})$, for example, reference values.

A system 4 for controlling process 1 is preset with these precomputed process parameters $Y_v$. During the subsequent process run, process 1 is controlled by preset system 4, as indicated by arrow 5. Also during the process, all essential process values are measured as shown by arrow 6. Based on the measured process values, by statistically preparing the measured values and computation of other, not directly measurable values, input values x and process parameters y are determined much more accurately than before the process run. After the process run, the measured input values x and process parameters y are supplied to a post computing means 7. The post computing means 7 accesses model M, with the current model parameters MP, in computing means 2 and iterates the precomputation based on the measured input values x. The computed results thus obtained for the process parameters are compared with the measured process parameters to determine deviations. The model parameters MP are adaptively modified based on the deviations observed to reduce the deviations. The adapted model parameters MP are stored in computing means 2 and are kept ready for use in the next precomputation. The adapted model parameters stored overwrite older values.

Figure 2:
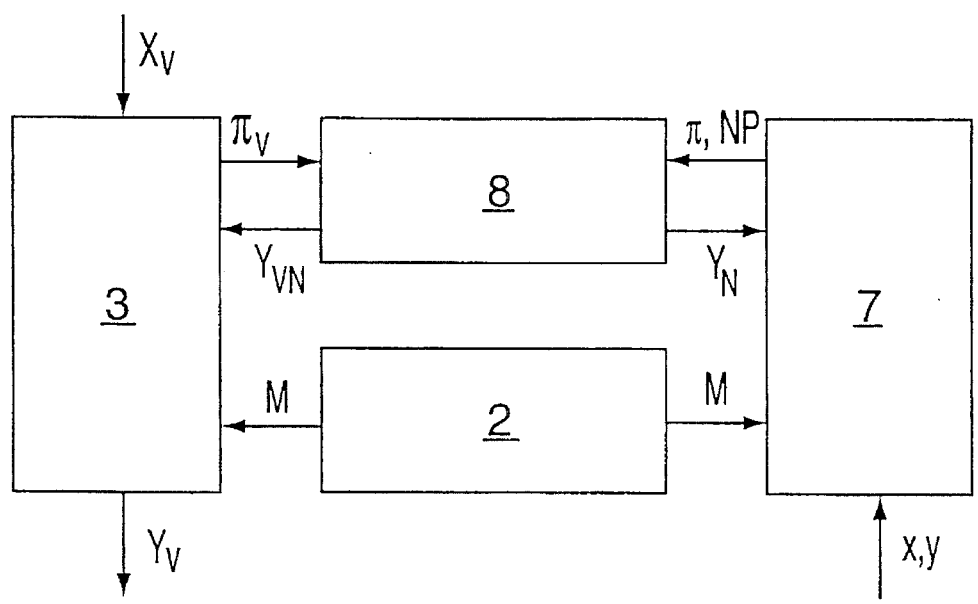
FIG. 2 is a block schematic which shows an example for combining the mathematical models with a neural network according to the invention.

FIG. 2 is a block diagram which shows an example of an embodiment of the present invention for combining the mathematical models in computing means 2 with a neural network 8 having variable network parameters NP. To precompute process parameters $Y_v$, precomputing means 3 first extracts the necessary partial models M from computing means 2 and supplies them with input values $X_v$. The computed results $\pi_v$ thus obtained by partial models M are supplied neural network 8. The neural network 8 forms a predictive value for process parameter $Y_v$ as a network response.

After the process run, the measured input values x are supplied to the partial models M in postcomputing means 7. The computed results π obtained by partial models M are supplied to neural network 8. The network response $Y_n$ of the neural network 8 is compared with the measured process parameter y in postcomputation means 7 to form a deviation. Depending on the result of the comparison, network parameters NP are adaptively modified to reduce the deviation.

Figure 3:
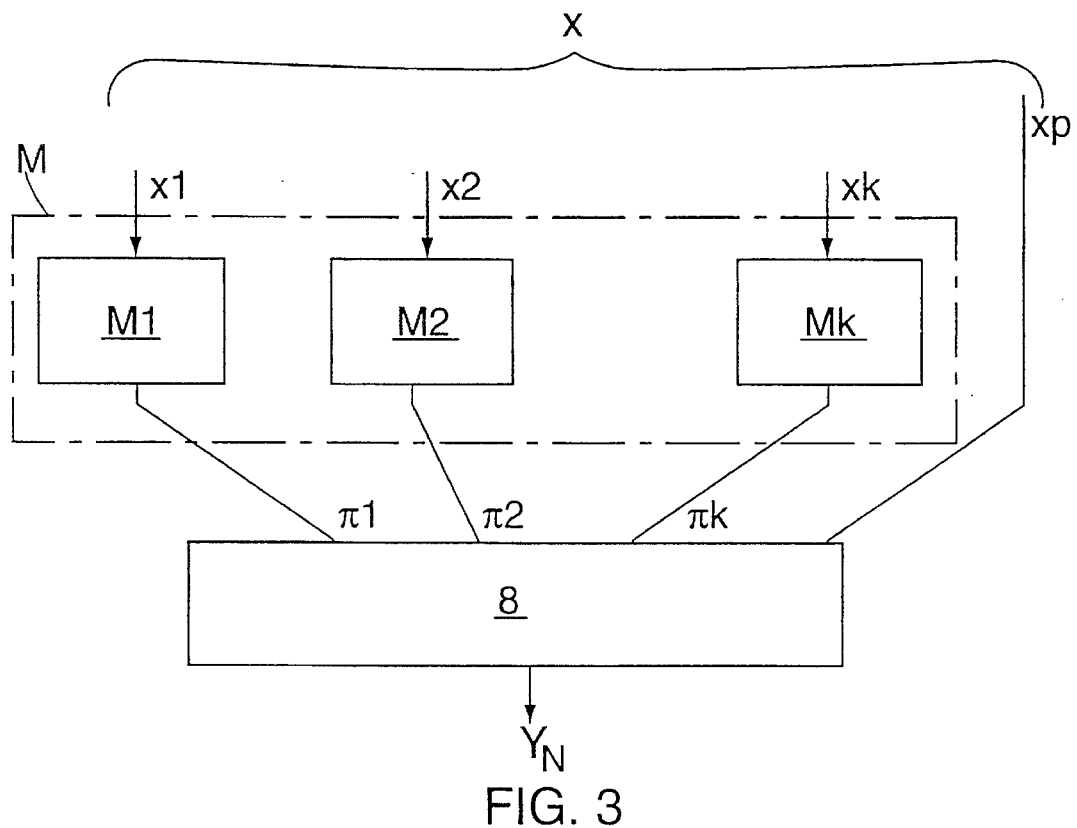
FIG. 3 is a block diagram illustrating the functional linkage of the partial models with the neural network.

FIG. 3 is a block diagram which illustrates the model M of the process to be conducted. Model M includes a plurality of partial models $M_1, M_2, \ldots M_k$. From the totality of all input values x, different sets of input values $X_1$ through $X_k$ are supplied to partial models $M_1$ through $M_k$. The computed results $\pi_1$ through $\pi_k$ obtained from partial models $M_1$ through $M_k$ are supplied, possibly together with additional input values $X_p$, to neural network 8. The neural network provides, as network response $Y_N$, a predictive value for process parameter $Y_v$ to be precomputed.

In a rolling train with k rolling stands, partial models $M_1$ through $M_k$ can compute, for example, the roll gap profile π for each rolling stand. From the roll gap profiles $\pi_1$ through $\pi_k$ thus determined, neural network 8 can form a predictive value for the strip profile, possibly taking into account additional input values $X_p$ such as, for example, strip tensions, strip width, entry and exit strip thickness, heat resistance of the strip, rolling speed, rolling time, pause time, total rolling force and total reverse bending force.

Figure 4:
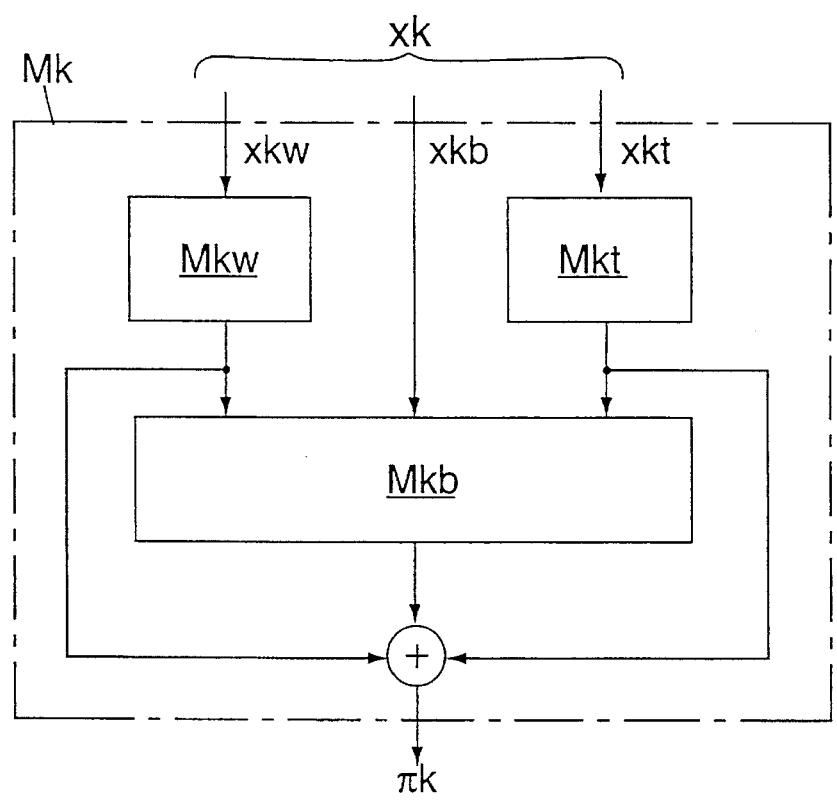
FIG. 4 is block diagram of a partial model.

FIG. 4 is a block diagram which shows an example of the structure of a partial model $M_k$ for computing the roll gap profile $\pi_k$ of the kth rolling stand. Partial model $M_k$ includes a wear model $M_{kw}$, a temperature model $M_{kt}$, and a bending model $M_{kb}$. The wear model $M_{kw}$ determines the influence of the roll wear on the roll gap profile. The temperature model $M_{kt}$ computes the influence of the different roll warming on the roll gap profile. The bending model $M_{kb}$ accounts for roll bending. Since wear and temperature of the backup roll affect the bending of the work roll, the computed results of wear model $M_{kw}$ and of the temperature model $M_{kt}$ are supplied to bending model $M_{kb}$ as additional input values. The computed results of all three models $M_{kw}$, $M_{kt}$ and $M_{kb}$ are additively linked to an estimated value of the roll gap profile $\pi_k$ of the kth rolling stand.

What is claimed is:

1. A method for conducting a process in a controlled system, the system including a computing means having a mathematical model of the process, the mathematical model including a plurality of partial models, and including a neural network having variable network parameters, the method comprising steps of:

a) supplying input values to the computing means;

b) precomputing, before each process run, at least one selected process parameter, using the mathematical model, based on the input values supplied to the computing means;

c) presetting the system with the at least one process parameter;

d) measuring the input values and the at least one process parameter during the process;

e) supplying the measured input values and the measured at least one process parameter to the computing means; and f) adaptively improving, at the end of the process, the precomputing of the at least one process parameter based on the measured input values and the measured at least one process parameter supplied to the computing means, the step of adaptively improving including sub-steps of i) computing a plurality of results obtained from the plurality of partial models, ii) supplying the plurality of results to the neural network, iii) obtaining a network response from the neural network derived from the plurality of results supplied to it, iv) comparing the network response of the neural network with the measured parameter to obtain a deviation, and v) adaptively modifying the network parameters of the neural network to reduce the deviation, the network parameters being adaptively modified for training the neural network on-line.

2. The method of claim 1 wherein input values, having an influence on the at least one process parameter which cannot be described with the mathematical model, are directly supplied to the neural network.

3. The method of claim 1 wherein the step of adaptively modifying the network parameters is performed on-line based on the measured input values and based on the measured process parameters.

4. The method of claim 1 wherein the process includes rolling processes.

5. The method of claim 4 wherein the partial models are assigned to individual rolling stands of a rolling train and wherein the neural network links the results of the partial models to form a predictive value of a process parameter of the rolling train.

6. The method of claim 5 wherein the partial models compute roll gap profiles of the individual rolling stands and wherein the neural network links the computed roll gap profiles to form a predictive value of a strip thickness profile.

7. An arrangement for conducting a process in a controlled system, the arrangement comprising:

a) a computing means, including a mathematical model of the process, the mathematical model including a plurality of partial models, for precomputing at least one process parameter based on input values;

b) means for presetting the system based on the at least one process parameter precomputed by the computing means;

c) means for measuring input values and process parameter values during a process run; and d) a neural network, the neural network obtaining computed results of the partial models for training the neural network on-line, the neural network forming a predictive process parameter value, the predictive process parameter value being provided to the computing means for adapting the at least one process parameter.

8. A method for estimating at least one process parameter of a process, the at least one process parameter used for controlling the process, the method comprising the steps of a) supplying input values to a computing means implementing an analytical process model of the process;

b) determining at least one intermediate value of the at least one process parameter using the analytical process model, the analytical process model determining the at least one intermediate value based on the input values;

c) providing the at least one intermediate value to a neural network structure;

d) generating an estimated process parameter value of the at least one process parameter using the neural network structure, the neural network structure generating the estimated process parameter value based on the at least one intermediate value of the at least one process parameter; and e) providing the estimated process parameter value to a controller for controlling the process.

9. The method of claim 8, wherein the step of generating the estimated process parameter value includes determining a future predictive process parameter value.

10. The method of claim 8, wherein the neural network structure generates the estimated process parameter, in dependence on input values supplied directly to the neural network structure.

11. The method of claim 8, wherein the step of generating the estimated process parameter value is preformed on-line.

12. The method of claim 8, wherein the at least one process parameter includes one on-line process parameter for performing an on-line training of the neural network structure.

13. The method of claim 12, further comprising the steps of:

e) generating performance data with the neural network structure; and f) determining at least one process parameter which can be used to improve the control of the process.

14. The method of claim 8, including the step of presetting the process with the at least one process parameter, the process including a rolling train process.

15. The method of claim 8, wherein the process is controlled by a controller for obtaining the at least one process parameter, the process including a rolling train process.

16. The method of claim 8, wherein the analytical process model includes partial models.

17. The method of claim 8, wherein the process includes rolling processes.

18. The method of claim 17, wherein the partial models are assigned to individual rolling stands of a rolling train and wherein the neural network structure links computational results generated by the analytical process model having partial models, the computational results generated by the partial models for each individual rolling stand to form a predictive value of a process parameter of the rolling train.

19. The method of claim 17, wherein the partial models compute rolling stand profiles of the individual rolling stands and wherein the neural network structure links the calculated roll gap profiles to form a predictive value for a strip thickness profile.

* * * * *